United States Patent
Cao et al.

(10) Patent No.: US 10,131,731 B2
(45) Date of Patent: Nov. 20, 2018

(54) ANTIMICROBIAL SURFACE COATINGS

(71) Applicants: Zhengbing Cao, Bothell, WA (US); Xinbo Sun, Bothell, WA (US); Simon Johnston, Bellevue, WA (US)

(72) Inventors: Zhengbing Cao, Bothell, WA (US); Xinbo Sun, Bothell, WA (US); Simon Johnston, Bellevue, WA (US)

(73) Assignee: OxiScience LLC, Redmond, WA (US)

( * ) Notice: Subject to any disclaimer, the term of this patent is extended or adjusted under 35 U.S.C. 154(b) by 0 days.

(21) Appl. No.: 14/704,582

(22) Filed: May 5, 2015

(65) Prior Publication Data

US 2015/0315389 A1  Nov. 5, 2015

Related U.S. Application Data

(60) Provisional application No. 61/988,642, filed on May 5, 2014.

(51) Int. Cl.
| | |
|---|---|
| *C08F 226/06* | (2006.01) |
| *C08F 220/56* | (2006.01) |
| *C09D 5/14* | (2006.01) |
| *C08F 220/32* | (2006.01) |

(52) U.S. Cl.
CPC ......... *C08F 226/06* (2013.01); *C08F 220/56* (2013.01); *C09D 5/14* (2013.01); *C08F 2220/325* (2013.01)

(58) Field of Classification Search
CPC .. A01N 59/00; C09D 5/16; Y10T 428/31645; C08F 220/56; C08F 2220/325
See application file for complete search history.

(56) References Cited

U.S. PATENT DOCUMENTS

| | | | | |
|---|---|---|---|---|
| 4,736,005 A | * | 4/1988 | Castner | C08F 220/56 507/225 |
| 5,490,983 A | | 2/1996 | Worley et al. | 424/405 |
| 6,469,177 B1 | | 10/2002 | Worley et al. | 548/333.5 |
| 8,821,907 B2 | | 9/2014 | Worley et al. | 424/405 |
| 2003/0056297 A1 | * | 3/2003 | Sun | D06M 13/352 8/115.51 |
| 2009/0120601 A1 | * | 5/2009 | Singh | C08F 220/56 162/164.3 |
| 2010/0311904 A1 | * | 12/2010 | Chambers | C08B 31/006 525/54.31 |
| 2012/0107620 A1 | | 5/2012 | Kaganove | 428/424.2 |
| 2012/0183494 A1 | * | 7/2012 | Worley | A01N 43/50 424/78.37 |

FOREIGN PATENT DOCUMENTS

| | | |
|---|---|---|
| WO | WO199420118 | 9/1994 |
| WO | WO2003106466 | 5/1996 |
| WO | WO2002030477 | 4/2002 |
| WO | WO2009158285 | 12/2009 |
| WO | WO2011091118 | 7/2011 |
| WO | WO2012096694 | 7/2012 |

OTHER PUBLICATIONS

USPTO structure search, Jun. 2017.*

* cited by examiner

*Primary Examiner* — Gregory Listvoyb
(74) *Attorney, Agent, or Firm* — Alvin T. Rockhill

(57) ABSTRACT

The subject invention discloses curable polymeric N-halamine precursors which are useful for forming an antimicrobial surface coating on an object or article of manufacture. The present invention more specifically reveals a cross-linkable, water soluble polymer which is particularly useful for coating substrates and which can be activated to provide such substrates with antimicrobial and/or odor reducing characteristics, said cross-linkable polymer being comprised of amine, amide, or imide group containing repeat units and epoxide or methylol group containing repeat units, wherein the ratio of amine, amide or imide group containing repeat units to epoxide or methylol group containing repeat units is at least 2:1.

12 Claims, No Drawings

ANTIMICROBIAL SURFACE COATINGS

This application claims the benefit of U.S. Provisional Patent Application Ser. No. 61/988,642, filed on May 5, 2014. The teachings of U.S. Provisional Patent Application Ser. No. 61/988,642 are incorporated by reference herein in their entirety.

TECHNICAL FIELD

The present invention relates in general to the field of antimicrobials, and more particularly, to compositions and methods to make durable and rechargeable antimicrobial surfaces coatings for textile, inorganic medium, plastic, metal and wood surfaces.

BACKGROUND OF THE INVENTION

Without limiting the scope of the invention, its background is described in connection with antimicrobial surfaces for coating, paint, textile, water disinfection medium and other related subjects.

It is widely recognized that bacteria, fungi, and viruses can live on surfaces that appear to be visually clean. Inside corners, bolted joints, and some surfaces are just some examples of areas that are difficult to clean. Control of microbial growth and contamination is both vital and critical in every aspect of life and in every environment, ranging from food and beverage, dairy processing, pharmaceuticals, electronics, construction industry to healthcare. Microbes and germs are a daily threat, and bacterial fouling is an undesirable, preventable yet an often-occurring phenomenon.

Environmental surfaces contaminated with infectious agents play an important role in transmission of infections, and they are responsible for about 20% of the documented outbreaks of healthcare-associated infections, particularly those caused by multidrug-resistant species, which are difficult to treat, often leading to serious morbidity and mortality, extra costs, and excess length of hospital stay. They also may impair the quality of life of the patient with a hospital acquired infection even after treatment. One critical factor for transmission of infectious agents is the ability of microorganisms to survive on environmental surfaces. Microorganisms have strong abilities to survive on the surfaces of ordinary materials; some species of microorganisms, including drug-resistant strains, can stay alive for more than 90 days. Contaminated surfaces may serve as significant and important sources for cross-contamination and cross-infection. For example, a hospital outbreak of Methicillin-resistant *Staphylococcus aureus* (MRSA) was directly linked to a stretcher and a handheld shower; a *Pseudomonas aeruginosa* outbreak in a hematology-oncology unit was caused by contaminated surface cleaning equipment; and a norovirus outbreak at a long-term-care facility was associated with contaminated surfaces of case-residents' rooms, dining room tables, and elevator buttons. Recent studies showed that patients harboring multidrug-resistant bacteria such as MRSA and Vancomycin-Resistant Enterococci (VRE) could heavily contaminate their surrounding environment, and the contaminated surfaces could significantly increase the risk of transmission to subsequent room occupants.

Despite major medical advances, infectious diseases continue to be the third leading cause of death in the United States and the leading cause worldwide. The cleaning and disinfecting of environmental surfaces are recommended to reduce the risk of such infections. However, the disinfected surfaces can be re-contaminated rapidly.

The antimicrobial surfaces can help to control the wide spreading of infectious agents. If high-touch, high-risk surfaces are covered with antimicrobial coatings and/or antimicrobial paints that can provide effective antimicrobial functions, the surfaces will be protected between cleaning and disinfecting, and this has the potential to significantly reduce the risk of infections. Antimicrobial coating and paints can also be used outside of healthcare facilities to reduce the risk of community-acquired infections, and in flu seasons, reduce the risk of transmission of flu.

The antimicrobial coatings and paints industries are a huge market with a total value of $558,700,000 in 2012 in the United States alone. The United States market for antimicrobial coatings is forecasted to reach $978,700,000 by the year 2015, propelled by increasing demand for enhanced levels of health, sanitation and hygiene, particularly in end-use markets of indoor air quality and medical devices. The trend of strong growth pace is likely to continue in the future, spurred by growing urgency for infection control in hospitals, nursing homes, public places of all types, food and beverage dispensing systems, public transportation systems, and the like.

Textile materials are good media for growth of microorganisms, particularly the drug-resistant bacteria in nosocomial infections, which have caused great concern to public health. Healthcare textiles usually include respirators, face masks, surgical gowns, isolation gowns, uniforms, patients' clothing, bedding materials, etc., which are used in healthcare facilities such as hospitals, medical and dental offices, public health clinics, assisted-living facilities, and home care. The humid and warm environments in textiles encourage the growth of the microbes. Infectious agents have strong abilities to survive on textiles, and some pathogens can survive for up to 90 days. Prevention of hospital acquired infections is therefore cost effective and achievable even when resources are limited. The currently used disposables can only serve as physical barriers. Once contaminated, they cannot inactivate the deposited microorganisms. During uses, the contaminated disposables can act as sources for direct or indirect transfer of infections. Furthermore, in the cases of leakages or "strike through", the barrier functions will be totally lost and the users will face great danger. Otherwise, in the present world most of us are more conscious about our hygiene and cleanliness. In the cases of outbreaks of emerging infectious diseases, such as severe acute respiratory syndrome (SARS) or avian flu, the demand for antimicrobial textiles, particularly gowns and face masks, will increase dramatically because not only healthcare workers and patients but also the general public will need them for protection.

There accordingly remains a need for new compositions and methods to prevent microbial infection or transmission, including new compositions for antimicrobial surfaces with effective biocidal properties.

SUMMARY OF THE INVENTION

One goal of the technology presented herein is to develop simple, practical, and cost-effective approaches to introduce biocidal functions onto objects' surfaces. The treated objects having biocidal function will be able to effectively inactivate a wide range of microorganisms upon contact or soon thereafter, making the resulting surface substantially microbe-free and hazard-free during use. To achieve this goal, N-halamine structures that can be covalently bound onto objects' surfaces, such as bound to functionality on the surface of the object, have been developed. An N-halamine is a compound containing one or more nitrogen-halogen covalent bonds that is normally formed by halogenating a nitrogen functional group, such as cyclic imide, amide, or amine groups. The nitrogen-halogen bond may comprise one of a nitrogen-chlorine bond, a nitrogen-bromine bond, or a nitrogen-iodine bond. In specific embodiments, the N-halamine may comprise at least one of a nitrogen-chlorine bond or a nitrogen-bromine bond. An attractive property of the N-halamine functionality is that when microbes come into contact with the N-halamine structure, a chlorine/bromine exchange reaction occurs between the N-halamine and functionality on the microbe, resulting in the death of the microorganism. This process consumes chlorines/bromines from the N-halamine, but the consumed chlorines/bromines can be fully recharged by subjecting the nitrogen to another halogenating agent treatment. Thus, N-halamines may be generally regarded as rechargeable batteries of covalently bound chlorines/bromines. N-halamines have been widely used as food and water disinfectants but new surface coating structures are still required.

The current disclosure presents a class of novel water soluble polymeric N-halamine precursors which contain at least one kind of reactive functional groups, at least one kind of N-halamine precursor functional groups, and (optionally) one kind of other functional groups that provides desired functionality to the polymer (e.g., water-solubility, anti-static function, hydrophobicity, etc.). The reactive functional groups will covalently bind the polymeric N-halamine precursor moieties onto the target objects' surfaces through self cross-linking and/or inter cross-linking with functionality on the target objects in the presence of an energy source or other cross-linking initiation, such as heating or electromagnetic radiation. The targeted surfaces may be textiles (including synthetic and natural fibers), inorganic medium, stone, concrete, plastic and wood, etc. After coating the target surface and cross-linking the N-halamine precursor, by internal cross-linking and/or cross-linking with surface functionality, the surface is treated with a chlorination/bromination process such that the coated the polymeric N-halamine precursor moieties could be transformed into polymeric N-halamines, providing durable and rechargeable antimicrobial function against microbes, such as, but not limited to, bacteria (including the drug-resistant species), mold and other fungi species, and viruses. Further, the cross-linking provides an attachment point between the polymeric N-halamine and the surface, thereby preventing leaching N-halamine into the surrounding environments. According to various embodiments, the antimicrobial functions were durable for months under normal in-use conditions, and could be easily monitored by a potassium iodine/starch test. In addition, if challenging conditions (e.g., blood contamination, organic staining, etc.) consumed more chlorines/bromines and reduced the antimicrobial functions, the lost functions could be readily and repeatedly regenerated by subsequent chlorination/bromination treatment.

Further, in those embodiments where the polymeric N-halamine precursor composition comprises other functional groups, the other functional group may be selected to provide render the coated objects some novel surface properties such as, but not limited to, super-hydrophobicity/hydrophilicity, anti-static properties, fire resistance, anti-crease properties, non-slip properties, anti-pilling properties, softening properties, stiffening properties, etc.

Other embodiments of the present disclosure provide a method for forming a polymeric N-halamine precursor comprising: polymerizing at least two free radically polymerizable monomers to form the polymeric N-halamine precursor, wherein the at least two radically polymerizable monomers comprise a first radically polymerizable monomer having a cross-linking group and the second radically polymerizable monomer having a nitrogen containing functional group capable of being converted to an N-halamine by a halogenation process. In specific embodiments the method may further comprise polymerizing at least one third radically polymerizable monomer in the polymerizing step, wherein the at least one third radically polymerizable monomer comprises structure or functionality that provides a desired property in a product surface coated with the polymeric N-halamine precursor.

A further embodiment of the present invention provides a method for producing an article of manufacture having antimicrobial characteristics (an antimicrobial product) and/or odor reducing characteristics. This method involves treating at least one surface of the article of manufacture with a polymeric cross-linkable N-halamine precursor. This polymeric N-halamine precursor will typically be water soluble or water dispersible and can be activated to provide the surface of the article with the desired antimicrobial characteristics to reduce the level of harmful and/or odor producing bacterial on the surface of the article. After the surface of the article has been coated with an aqueous medium containing the N-halamine precursor it is heated to an elevated temperature to cross-linking the polymer thereby affixing it to at least one surface of the article. The cured polymeric N-halamine precursor coating on the surface of the article is then treated with a halogen containing material which activates it by generating N-halamine groups on surface of the article (as N-halamine moieties which are bonded to the cross-linked polymeric surface coating).

Still further embodiments provide for a product or article of manufacture comprising at least one surface, wherein the at least one surface has a coating comprising a cured polymeric N-halamine precursor. Other embodiments provide for a product or article of manufacture comprising at least one surface, wherein the at least one surface has a coating comprising a cured polymeric N-halamine composition.

Still further embodiments of the present disclosure provide for a polymeric N-halamine precursor comprising a structure according to formula:

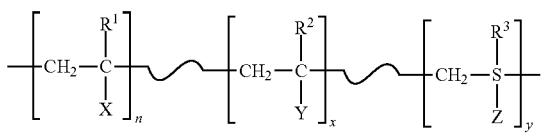

wherein the symbol ⁀ indicates that the repeat units within the polymer are distributed in an essentially random order, wherein X is a substituent comprising a reactive cross-linking group, Y is a substituent comprising a nitrogen containing functional group; and Z is a functional group that imparts desired functionality to the polymeric precursor; $R^1$, $R^2$, and $R^3$ can be the same or different and are independently selected from hydrogen atoms, $C_1$-$C_{20}$ alkyl groups, $C_1$-$C_{20}$ alkyl groups containing at least one heteroatom, $C_3$-$C_{20}$ cycloalkyl groups, $C_3$-$C_{20}$ cycloalkyl groups containing at least one heteroatom, aryl, heteroaryl, and halogen; wherein n and x are integers ranging from 1 to about 1,000,000 and wherein y is an integer ranging from 0 to about 1,000,000.

The present invention more specifically reveals a cross-linkable, water soluble polymer which is particularly useful for coating substrates and which can be activated to provide such substrates with antimicrobial and/or odor reducing characteristics, said cross-linkable polymer being comprised of amine, amide, or imide group containing repeat units and epoxide or methylol group containing repeat units, wherein the ratio of amine group containing repeat units to epoxide or methylol group containing repeat units is at least 2:1.

The subject invention also discloses an aqueous coating composition which is particularly useful for coating substrates to provide the substrate with antimicrobial characteristics, said aqueous coating compositions being comprised of water and a cross-linkable, water soluble polymer which is comprised of amine, amide, or imide group containing repeat units and epoxide or methylol group containing repeat units, wherein the ratio of amine group containing repeat units to epoxide or methylol group containing repeat units is at least 2:1.

The present invention further discloses a process for making a substrate with a durable antimicrobial coating which comprises (1) applying an aqueous coating composition to the substrate to produce a coated substrate, wherein the aqueous coating composition is comprised of water and a cross-linkable, water soluble polymer which is comprised of amine, amide, or imide group containing repeat units and epoxide or methylol group containing repeat units, wherein the ratio of amine group containing repeat units to epoxide or methylol group containing repeat units is at least 2:1, (2) heating the coated substrate to a temperature of at least about 100° C. produce a substrate with the durable coating, and (3) activating the substrate with the durable coating with a halogen to produce the durable antimicrobial coating.

The subject invention also reveals a coated substrate having a cross-linked polymer bonded to the surface thereof wherein the cross-linked polymer is comprised of repeat units having N-halamine groups and wherein the cross-linked polymer is derived from a cross-linkable, water soluble polymer which is comprised of amine, amide, or imide group containing repeat units and epoxide or methylol group containing repeat units, wherein the ratio of amine group containing repeat units to epoxide or methylol group containing repeat units is at least 2:1.

DETAILED DESCRIPTION OF THE INVENTION

The present disclosure provides new water soluble and curable polymeric N-halamine precursors which may be prepared with free radical copolymerization from at least two different radically polymerizable monomers. The water soluble, curable polymeric N-halamine precursor may be coated or applied to a surface to be treated, cured to bond the polymeric N-halamine precursor to the surface or object to be treated and then halogenated to provide a polymeric N-halamine structure. Once applied, cured and halogenated, the coated surface may then display antimicrobial properties. In other embodiments, the curable polymeric N-halamine precursor may be substantially water insoluble, but may be applied to a surface, for example as a neat compound or as a solution in a suitable solvent, such as an organic solvent, and then subsequently cured and treated with a halogenating agent. As used herein, the term "polymeric N-halamine precursor" means a polymeric structure comprising functionality that may be converted to an N-halamine functional group, for example, by halogenation.

As generally used herein, the terms "include" and "have" mean "comprising". As generally used herein, the term "about" refers to an acceptable degree of error for the quantity measured, given the nature or precision of the measurements. Typical exemplary degrees of error may be within 20%, 10%, or 5% of a given value or range of values. Alternatively, and particularly in biological systems, the term "about" may mean values that are within an order of magnitude, potentially within 5-fold or 2-fold of a given value.

In specific embodiments, the polymeric N-halamine precursor may be prepared by at least three different radically polymerizable monomers. According to these embodiments, the first radically polymerizable monomer may comprise a radically polymerizable double bond and at least one reactive group, X, capable of forming a cross-link either internally within the polymer or with specific functionality on the surface to be treated. The second radically polymerizable monomer may comprise a radically polymerizable double bond and at least one nitrogen containing functionality, Y, that is capable of being converted to an N-halamine. In those embodiments having at least a third radically polymerizable monomer, the third radically polymerizable monomer may comprise a radically polymerizable double bond and structure or functionality, Z, that provides a desired property to the resulting copolymer. Those resultant copolymers may comprise at least two or, in specific embodiments, at least three kinds of functional groups from the radically polymerizable monomers where each may provide different functions for the further coating and applications. According to certain embodiments, the polymeric N-halamine precursor may have a structure of formula:

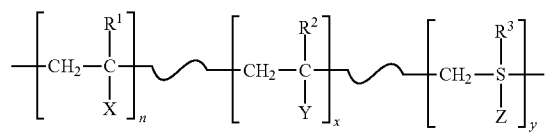

wherein the symbol ⁓ indicates that the repeat units within the polymer are distributed in an essentially random order, wherein X is a substituent comprising a reactive cross-linking group, Y is a substituent comprising a nitrogen containing functional group; and Z is a functional group that imparts desired functionality to the polymeric precursor; $R^1$, $R^2$, and $R^3$ can be the same or different and are independently selected from hydrogen atoms, $C_1$-$C_{20}$ alkyl groups, $C_1$-$C_{20}$ alkyl groups containing at least one heteroatom, $C_3$-$C_{20}$ cycloalkyl groups, $C_3$-$C_{20}$ cycloalkyl groups containing at least one heteroatom, aryl, heteroaryl, and halogen; wherein n and x are integers ranging from 1 to about 1,000,000 and wherein y is an integer ranging from 0 to about 1,000,000.

The reactive groups X: according to various embodiments, the copolymer may be covalently bound onto a surface of the object to be treated by a crosslinking process. For example, in one embodiment, the cross-linking process may comprise reaction of the reactive groups X with functionality on the surface of the treated material, such as, hydroxyl, amine, amide, imide, and other functional groups present on the surface of the object or the polymers themselves. According to another embodiment, the cross-linking process may comprise reaction of one X group with other X groups in the copolymer, forming self cross-linking, for example, for forming a hardened polymeric surface on the coated surface of the object. According to various embodiments, reactive group X may be selected from epoxide containing groups, such as a glycidyl group, and/or an N-Hydroxymethylamine group. Other cross-linking groups, such as thiols, esters, amides, carboxylic acids, are known and may also be utilized as a reactive group X. In specific embodiments, the reactive group X may have a structure as shown in the following formulas:

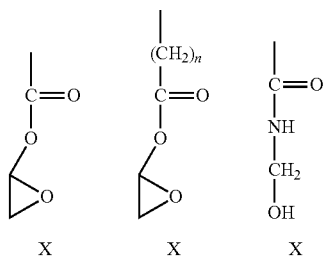

where n may be an integer having a value greater than or equal to 0, such as an integer from 1 to 10 or an integer from 1 to 4. Reactive group X may further comprise functionality shown herein but linked to the radically polymerizable double bond by a carbon linker between the double bond and the cross-linking functional group.

The groups Y: In various embodiments, the nitrogen containing group, Y, may be the structure that is converted into the N-halamine antimicrobial group. In certain embodiments, the group Y may be selected to provide improved water solubility in the polymeric N-halamine precursor composition as well as being able to be converted to an N-halamine. After halogenation, the nitrogen containing group Y may be converted to an H-halamine which could provide potential biocidal functions. According to various embodiments, functional group Y may be any nitrogen containing functional group that may be converted to an N-halamine by halogenation. Examples of suitable nitrogen containing functional groups include groups containing at least one $sp^3$ hybridized nitrogen bound to a hydrogen, such as primary, and secondary amines, amides, imides, cyclic amines (such as hydantoins, piperazines, etc.), cyclic imides, cyclic amides, and aromatic and heteroaromatic amine, amide, or imide compounds. In certain embodiments, suitable water soluble monomers with N-halamine precursor structures may include alkyl acrylamides, such as meth acrylamide and acrylamide, 3-allyl-5,5-dimethylhydantoin, and diacetone acrylamide, etc, as shown in the following structures for group Y:

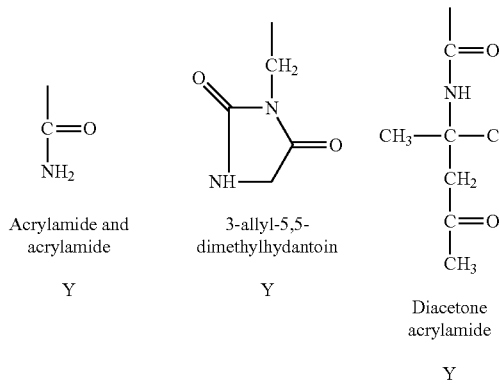

The functional groups Z: According to certain embodiments, the polymeric N-halamine precursor may comprise a third monomer, where the third monomer comprises monofunctional or multi-functional groups which may be optionally introduced to the copolymer structure to provide the treated objects' surfaces some unique and desired properties for specific applications. According to certain embodiments, hydrophobic monomers where Z is a long hydrophobic alkyl or perfluoroalkyl chain, such as, for example, 1H,1H,2H, 2H-perfluorodecyl methacrylate or a $C_{10}$-$C_{30}$ alkyl methacrylate may provide super hydrophobicity to the resultant surfaces. In other embodiments, hydrophilic monomers having polar or charged Z functional groups, for example, carboxylic acid, sulfonic acid, or quaternary ammonium groups, such as methacrylic acid, 2-acrylamido-2-methylpropane sulfonic acid, 3-trimethylammonium propyl methacrylamide chloride, etc., may provide super hydrophilicity to the resultant surfaces. In other embodiments to provide antistatic function to the resultant surfaces, certain water soluble monomers, such as, diallyldimethylammonium chloride may be used as modifier of the coating to provide the treated products electrical conductivity and antistatic property. Certain examples of potential Z functional groups could be the following formula:

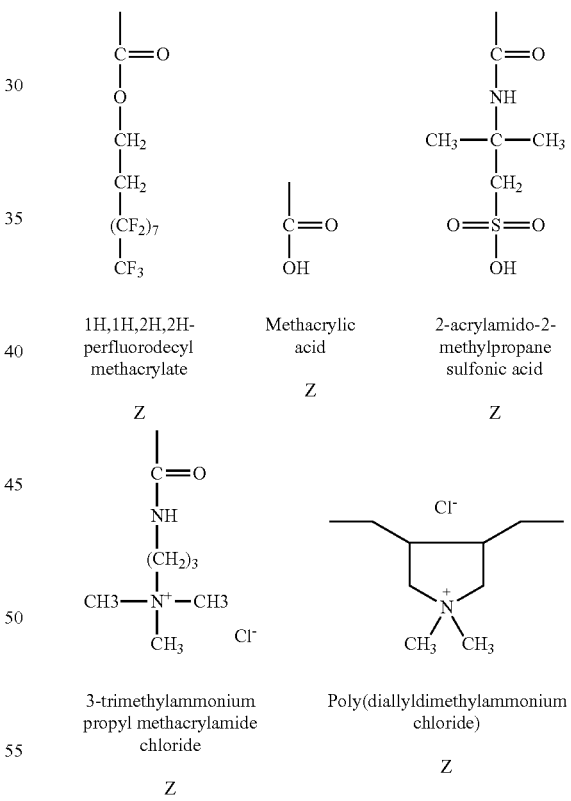

Various embodiments of the present disclosure provide a curable polymeric N-halamine precursor that is capable of forming a coating on at least one surface of targeted objects. The resulting polymer solutions could be readily diluted for diverse applications or alternatively the polymeric coating composition may be applied to the surface neat. In some instances where the polymeric N-halamine precursor displays suitable water solubility, the water soluble polymers can be mixed into other materials and solvents (such as aqueous solutions) and/or can be used to coat existing devices and structures. In certain embodiments after the curing under elevated temperature and/or electromagnetic irradiation, the water soluble polymeric coating may be transformed into a water insoluble coating with 3-dimensional network structure due to the cross-linking between polymeric chains and/or cross-linking with surface functionality on the coated surface. In other embodiments, the polymeric N-halamine precursor may be substantially water insoluble, where the precursor may be applied to at least one surface of the object as a neat composition or dissolved in a suitable organic solvent. According to these embodiments, the water insoluble precursor coating may then be heated to evaporate the solvent (if present) and cured using heat and/or electromagnetic irradiation.

Once applied to the at least one surface of the material and cured to form a cross-linked coating, the nitrogen residues in the cured polymeric N-halamine precursor Halogenation may be effected using commercially available halogenating (i.e., brominating or chlorinating agents). Suitable halogenating agents include, but are not limited to an aqueous solution of a hypobromide or hypochlorite salt, commercial bleach, molecular halogen (i.e., $Cl_2(g)$, $Br_2(l)$ or $I_2(s)$), trichloroisocyanuric acid, and the like. Upon halogenation, a majority of the amine residues in the Y group of the copolymer are converted to a N-halamine residue. After exposure to halogen source(s), the resultant surfaces show biocidal activity against bacteria, fungi, and viruses.

The biocidal activity of the surfaces may be regenerated. For example, in certain embodiments, the surface may gradually lose its biocidal activity due to exposure to and killing of microbes or environmental reasons resulting in loss of the halogen from the N-halamine structure. According to these embodiments, the biocidal activity of the N-halamine polymeric material may be regenerated by treating the coating to halogenating conditions. Upon regeneration, the regenerated N-halamine coating displays biocidal activity similar to newly halogenated N-halamine coating compositions. According to these embodiments, the treated surface may be repeatedly regenerated to regenerate the biocidal activity by simply exposing the surface coating to halogenating conditions.

According to one embodiment, the present disclosure provides for a method for forming a polymeric N-halamine precursor. The methods may comprise polymerizing at least two free radically polymerizable monomers to form the polymeric N-halamine precursor, wherein the at least two radically polymerizable monomers comprise a first radically polymerizable monomer having a cross-linking group and a second radically polymerizable monomer having a nitrogen containing functional group, wherein the nitrogen containing functional group is capable of being converted to an N-halamine by a halogenation process. In certain embodiments, the polymerizing step may further comprise at least one third radically polymerizable monomer, wherein the third radically polymerizable monomer comprises structure or functionality that provides a desired property to a product surface coated with the polymeric precursor.

According to another embodiment, the present disclosure provides for a method for producing an antimicrobial product or article of manufacture. The method comprises treating at least one surface of an object or article of manufacture with a polymeric N-halamine precursor, as described herein; cross-linking at least one cross-linking group present in the polymeric N-halamine precursor to form a cured polymeric N-halamine precursor coating on the at least one surface; and halogenating the cured polymeric N-halamine precursor to provide a cured polymeric N-halamine coating on the at least one surface of the object or article of manufacture. In certain embodiments, the polymeric N-halamine precursor may comprise an aqueous solution of the polymeric N-halamine precursor. In other embodiments, the polymeric N-halamine precursor may comprise a solution of the polymeric N-halamine precursor dissolved in an organic solvent. In specific embodiments, the method may further comprise removing a solvent from a solution of the polymeric N-halamine precursor prior to the cross-linking step.

According to still another embodiment, the present disclosure provides for an object or article of manufacture having at a cured polymeric N-halamine precursor coated onto at least one surface of the object or article of manufacture. In another embodiment the present disclosure provides for an object or article of manufacture having at a cured polymeric N-halamine coating coated onto at least one surface of the object or article of manufacture.

In one embodiment, the present disclosure provides a water soluble and curable polymer composition that can be used to form cross-linked coating on natural or synthetic fibers or textiles with covalent bonds. For example, upon curing, the polymeric N-halamine precursor may form cross links with surface functionality on the natural or synthetic fiber surface. Suitable textiles and fabrics include, but are not limited to fabrics made from cotton, wool, bamboo, hemp, silk, polyester, rayon, nylon, other cellulosic and/or cellulosic/synthetic blend of fibers/synthetic fibers. In certain aspects, the polymeric N-halamine precursors may be grafted onto textiles and fabrics with a typical textile finishing procedure, such as a pad-dip-cure. The coated copolymers may then be exposed to cross-liking conditions to bond the polymeric precursor to the fabric surface by forming cross-links between a cross-linking functional group in the polymeric N-halamine precursor and a functional group on the molecular structure of the fabric or textile and may be readily converted to N-halamine structures on exposure to a halogen source such as, for example, commercially available chlorine bleach or other halogenating source. According to these embodiments, the coated textiles and fibers may exhibit potent antimicrobial properties again microorganisms such bacteria, fungi, and virus, and these properties are durable and rechargeable. Certain embodiments of the present disclosure include antimicrobial fabrics and textiles that have been treated with the polymeric N-halamine precursor as described herein.

In another embodiment, the present disclosure provides water soluble and curable polymeric N-halamine precursors that may be used to form cross-linked coatings on at least one surface of an organic or inorganic medium, such as marble, zeolite, ceramic, diatomaceous earth, sepiolite, maifanite, concrete, stone, sand, brick or masonry, glass, metal (such as, but not limited to iron, steel, stainless steel, chrome, aluminum, etc.), wood, wood pulp products (i.e., paper, cardboard, etc.), organic polymers, plastics, rubber, leather, coated surfaces (such as painted surfaces), electronics, etc. One of ordinary skill in the art would understand that the polymeric N-halamine precursors may be used to treat a variety of surfaces without limiting the scope of the subject matter described herein. Marble typifies an inert nonporous hard surface substrate, whereas are microporous, aluminosilicate minerals commonly used as commercial adsorbents. In certain aspects, the polymeric N-halamine precursors were coated onto zeolite's porous structure surfaces with a simple soak-dry-cure procedure, and onto nonporous hard surface substrate such as marble. In specific embodiments, the present disclosure provides for an organic or inorganic medium that has been treated on at least one surface with the polymeric N-halamine precursor as described herein. Subsequent to treating the organic or inorganic medium with the polymeric N-halamine precursor, the polymeric N-halamine precursor may be cured to form cross-links, and then halogenated to provide an antimicrobial surface on the organic or inorganic medium.

Certain advantages of the new materials and methods are that the polymeric N-halamine precursors may be water soluble polymers; the polymeric N-halamine precursors are curable with functional groups from materials surfaces or functional groups within themselves; in embodiments with water soluble polymeric N-halamine precursors, no organic solvents were involved in the procedures; and the biocidal efficacies and functional effects could be adjusted by changing the ratio of co-monomers. In addition, the approaches described herein are simple, practical, and cost-effective.

Further, in one embodiment, the present disclosure provides a water base antimicrobial solution with water soluble N-halamine ingredients and water soluble polymer compositions that can be used to form coatings on soft surface and hard surface with physical or chemicals bonds. For example, upon drying, the polymer compositions may form films on the natural or synthetic fiber surface, or may form films on other soft and hard surfaces. Suitable soft surfaces include, but are not limited to fabrics made from cotton, wool, bamboo, silk, polyester, rayon, nylon, other cellulosic and/or cellulosic/synthetic blend of fibers/or synthetic fibers. Suitable hard surfaces include, but are not limited to articles made from plastic, wood, metal, granite, marble, tile, porcelain, glass, zeolite, etc. In certain aspects, the polymer and N-halamine ingredients may be coated or grafted onto soft surface such as textiles with a typical textile finishing procedure or spray-dry or soak-dry. In certain aspects, the polymer and N-halamine ingredients may be coated or grafted onto hard surface with a simple spray-dry or soak-dry procedure. According to these embodiments, the coated soft surfaces such as textiles and hard surfaces such as metal may exhibit potent antimicrobial properties again microorganisms such bacteria, fungi, and virus, and these properties are persistent and rechargeable. Certain embodiments of the present disclosure include antimicrobial soft surfaces and hard surfaces that have been treated with the N-halamine-containing polymer solution as described herein.

These and other features of the various embodiments of the present disclosure will become more apparent upon consideration of the following examples. The various embodiments of this disclosure described in the following examples are not to be considered as limiting the invention to their details.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

Preparing the Water Soluble and Curable Copolymer Modifiers

Copolymerization of water soluble N-halamine precursor monomers, such as methacrylamide or acrylamide, with other co-monomers was conducted in aqueous solution at evaluated temperature with the addition of a radical initiator (water soluble initiator, such as potassium persulfate, sodium persulfate, ammonium persulfate and water soluble Azo initiators). The total monomers concentration ranged from 0.1% to 60%. Prior to the polymerization, the air was removed from the reaction vessel by nitrogen ($N_2$) flush.

Surface Coating

General Surface Coating Procedures

A certain concentration of polymeric N-halamine precursor solution was coated onto targeting objects' surfaces by one of spraying, wiping, soaking, etc. The resultant objects were dried at room temperature or elevated temperature with or without air circulation to remove the solvent. After the drying, all of the subjects were put into an oven and were cured at a temperature ranging from 100° C. to 800° C. for certain duration. Alternative process for subjects' surfaces only, the coated surfaces were cured for a certain duration under heating gun, infrared heat, and microwave, and the like.

Textile Finishing

A typical textile finishing procedure "dip-pad-cure" was used to graft (covalently bond) the polymeric N-halamine precursor onto the textile materials. A certain amount of fabrics was dipped into the diluted aqueous polymer solution containing polymeric N-halamine precursor under room temperature, the polymer concentration could be range from 0.1 to 60%. Then the fabrics were padded through a wringer or extractor to achieve a wet pickup which range from 50% to 250%, and dried in an oven at 50-110° C. for certain duration. Afterwards, the fabrics were cured at predetermined temperatures for a certain period of time. The resultant fabrics were washed copiously with water and dried at room or evaluated temperature. The polymeric N-halamine precursor was covalently bonded onto the fabrics.

Inorganic Medium Coating

A certain amount of inorganic mediums were soaked in polymeric N-halamine precursor solution which concentration range from 0.1%-60%. The resultant inorganic mediums were dried at room temperature or elevated temperature with or without air circulation. After the drying, the dried mediums were put into an oven and were cured at high temperature range from 100° C. to 800° C. for certain duration. Alternative process, the dried mediums were cured with certain duration under heating gun, infrared heat, and microwave, etc.

Grafting Yields

The coated subjects were dried in air overnight and stored in a desiccator to reach constant weights. The graft yield was calculated according to equation (1):

$$\text{Graft yield (\%)} = \frac{(W_g - W_0)}{W_0} \times 100 \quad (1)$$

where $W_0$ and $W_g$ were the weights of the original and grafted objects, respectively.

Chlorination and Bromination

The cured polymeric N-halmaine precursor-grafting samples were immersed in a certain concentration of halogenating agent, such as sodium hypochlorite or sodium hypobromide solution, which containing 0.0001-0.1% (v/v) of a nonionic wetting agent (such as TX-100) under constant stirring for 45 min at room temperature. The samples were then washed thoroughly with running water and de-ionized water, and dried in air overnight and stored in a desiccator.

For those bulk objects with big surface such as wall, wood plate, steel, marble, concrete, etc., the surfaces were wiped several times with a certain concentration of halogenating agent, such as sodium hypochlorite or sodium hypobromide solution, which containing 0.0001-0.1% (v/v) of a nonionic wetting agent (such as TX-100) for 60 min at room temperature. The sample surfaces were then washed thoroughly with running water and de-ionized water, and dried in air overnight.

Iodometric Titration Test

The active chlorine/bromine contents of the chlorinated/brominated polymeric N-halamine samples were determined by iodometric titration. In this procedure 10~50 mg of chlorinated/brominated samples were cut/crushed into fine powders, and treated with 1 gram of KI in 50 mL de-ionized water and the pH value was adjusted to 4 (with acetic acid) at room temperature under constant stirring for 1 h. The formed $I_2$ was titrated with standardized sodium thiosulfate aqueous solution. The un-chlorinated/un-brominated samples were tested under the same conditions to serve as controls.

The available active chlorine content on the fabrics was calculated according to equation (2):

$$Cl\ \% = \frac{35.5}{2} \times \frac{(V_{Cl} - V_0) \times 10^{-3} \times 0.01}{W_{Cl}} \quad (2)$$

where $V_{Cl}$ and $V_0$ were the volumes (mL) of sodium thiosulfate solutions consumed in the titration of the sample and the control, respectively, and $W_{Cl}$ (g) was the weight of the sample.

The available active bromine content on the fabrics was calculated according to equation (3):

$$Br\ \% = \frac{80}{2} \times \frac{(V_{Br} - V_0) \times 10^{-3} \times 0.01}{W_{Br}} \quad (3)$$

where $V_{Br}$ and $V_0$ were the volumes (mL) of sodium thiosulfate solutions consumed in the titration of the sample and the control, respectively, and $W_{Br}$ (g) was the weight of the sample.

To establish the optimal copolymerization, grafting, and chlorination/bromination conditions, for each polymeric N-halamine precursor, in each copolymerization, different methacrylamide (MAA) or acrylamide (AA) concentrations with other co-monomers were used; for the grafting, at each formulation, different curing times (for example, 10 min, 30 min, 45 min, and 60 min) and different curing temperatures (for example, 80° C., 90° C., 100° C., and 120° C.) were evaluated; for the chlorination/bromination, different halogenating agents concentration and different pH were evaluated.

Water Base Antimicrobial Solution for Soft and Hard Surfaces

Antimicrobial aqueous solution can be prepared by dissolving/dispersing N-halamines and polymeric binders into water. The total N-halamine concentration was range from 0.1% to 60%. The total polymeric binder concentration was range from 0.1 to 80%. The antimicrobial coating can be achieved by applying the prepared aqueous solution onto soft or hard surfaces and dry.

Example 1

Methacrylamide (50.1 g, 90 mol %), glycidyl methacrylate (4.63 g, 10 mol %), potassium persulfate (0.27 g), water (492.6 g) were simultaneously charged into a three-necked flask (1000 mL). The mixture was then agitated at 60° C. for 1 hour under nitrogen atmosphere. Tert-butlycatechol (0.27 g) was then added to the reaction mixture, and the copolymer solution was cooled down at room temperature and the resultant polymer solution contained 10% polymeric N-halamine precursor A.

Example 2

Acrylamide (56.8 g, 80 mol %), glycidyl methacrylate (14.2 g, 10 mol %), 2-acrylamido-2-methylpropane sulfonic acid (20.7 g, 10%) potassium persulfate (0.34 g), water (215 g) were simultaneously charged into a three-necked flask (500 mL). The mixture was then agitated at 70° C. for 0.5 hours under nitrogen atmosphere. Tert-butlycatechol (0.43 g) was then added to the reaction mixture, and the copolymer solution was cooled down at room temperature and the resultant polymer solution contained 30% polymeric N-halamine precursor B.

Example 3

About 10 grams of bleached cotton knit fabrics was dipped into 100 mL of diluted polymer solution containing 1% polymeric N-halamine precursor A under room temperature, padded through a laboratory wringer to 110% wet pickup, and dried in an oven at 110° C. for 60 min, and then cured in an oven at 180° C. for 2 min. The resultant fabrics were washed copiously with distilled water, dried at 60° C. for 24 hours, and stored in a desiccator for 72 hours to reach constant weights. The graft yield was 0.8%. The grafted fabrics were immersed in 0.1% sodium hypochlorite solution containing 0.05% (v/v) of a nonionic wetting agent (TX-100) under constant stirring for 30 minutes at room temperature. The active chlorine content of the chlorinated fabrics was 1000 ppm.

Example 4

About 10 g of polyester microfiber was dipped into 100 mL of diluted polymer solution containing 2% polymeric N-halamine precursor B under room temperature, padded through a laboratory wringer to 96% wet pickup, and dried in an oven at 110° C. for 45 minutes, and then cured in an oven at 180° C. for 5 minutes. The resultant fabrics were washed copiously with distilled water, dried at 60° C. for 24 hours, and stored in a desiccator for 72 h to reach constant weights. The graft yield was 0.6%. The grafted fabrics were immersed in 0.1% sodium hypochlorite solution containing 0.05% (v/v) of a nonionic wetting agent (TX-100) under constant stirring for 30 minutes at room temperature. The active chlorine content of the chlorinated fabrics was 460 ppm.

Example 5

A piece of marble sample (24 g, 10×5×0.2 cm) was wiped twice with 10% polymeric N-halamine precursor A. After air drying, the marble sample was cured with a heating gun at 200° C. for 5 minutes. The resultant marble was fully washed, air dried, and achieved 0.1% graft yield. The result marble was wiped twice with 5% Clorox regular bleach. Iodometric titration revealed that the chlorinated marble had a total chlorine atom area density of $(1.26\pm0.14)\times10^{15}$ atoms/cm$^2$.

Example 6

In this experiment 10 grams of zeolite was soaked in 40 ml 10% polymeric N-halamine precursor A containing 0.001% TX100 for 10 minutes. After air drying, the coated zeolite was cured in oven at 150° C. for 1 hour. The resultant zeolite had 6.45% graft yield.

The coated zeolite were immersed in 1% sodium hypobromide solution, which containing 0.0001-0.1% (v/v) of TX-100 and the pH value was adjusted to 6 with acetic acid. After constant stirring for 45 minutes at room temperature, the samples were then washed thoroughly with running water and de-ionized water, and dried in air overnight and stored in a desiccator. Iodometric titration indicated that the brominated zeolite had total bromine content 4.43%.

Example 7

In this experiment, 5 grams of N-chloro-N-sodiobenzenesulfonamidate, 3 grams of 5,5-dimethylhydantoin and 10 grams of acrylic emulsion, 5 grams of starch were dissolved/dispersed in 100 mL water. The antimicrobial aqueous solution can be spray onto granite surface. After air drying, the coated granite surface had 24 µg/cm$^2$ of active chlorine to provide antimicrobial function.

Example 8

About 10 g of a blend containing 70% polyethylene terephathlate (polyester) and 30% rayon was dipped into 100 mL of diluted polymer solution containing 2% polymeric N-halamine precursor B under room temperature, padded through a laboratory wringer to 90% wet pickup, and dried in an oven at 110° C. for 45 minutes, and then cured in an oven at 180° C. for 5 minutes. The resultant fabrics were washed copiously with distilled water, dried at 60° C. for 24 hours, and stored in a desiccator for 72 hours to reach constant weights. The graft yield was 0.5%. The grafted fabrics were immersed in 0.1% sodium hypochlorite solution containing 0.05% (v/v) of a nonionic wetting agent (TX-100) under constant stirring for 30 minutes at room temperature. The active chlorine content of the chlorinated fabrics was 460 ppm.

Example 9

About 10 grams of cotton knit toweling was dipped into 100 mL of diluted polymer solution containing 1% polymeric N-halamine precursor A under room temperature, padded through a laboratory wringer to 110% wet pickup, and dried in an oven at 110° C. for 60 minutes, and then cured in an oven at 180° C. for 2 minutes. The resultant fabrics were washed copiously with distilled water, dried at 60° C. for 24 hours, and stored in a desiccator for 72 hours to reach constant weights. The graft yield was 0.7%. The grafted fabrics were immersed in 0.1% sodium hypochlorite solution containing 0.05% (v/v) of a nonionic wetting agent (TX-100) under constant stirring for 30 minutes at room temperature. The active chlorine content of the chlorinated fabrics was 600 ppm.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the specifications and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

All numerical ranges stated herein include all sub-ranges subsumed therein. For example, a range of "1 to 10" is intended to include all sub-ranges between and including the recited minimum value of 1 and the recited maximum value of 10. Any maximum numerical limitation recited herein is intended to include all lower numerical limitations. Any minimum numerical limitation recited herein is intended to include all higher numerical limitations.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, for any reference made to patents and printed publications throughout this specification, each of the cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A cross-linkable, water soluble polymer, said cross-linkable polymer having the structural formula:

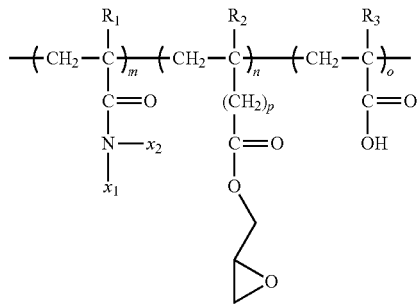

wherein, $R_1$, $R_2$, and $R_3$ can be the same or different and are independently selected from hydrogen atoms and alkyl groups containing from 1 to 10 carbon atoms; wherein p is an integer ranging from 0 to about 10; wherein m and n are integers ranging from 10 to about 1,000,000; wherein o is an integer ranging from 0 to about 1,000,000; wherein $x_1$ represents a chlorine atom, wherein $x_2$ is selected from hydrogen atoms and chlorine atoms; wherein the ratio of amide containing repeat units to epoxide group containing repeat units is at least 2:1, and wherein the different repeat units are distributed throughout the polymer in an essentially random order, and wherein said cross-linkable polymer can be used for coating substrates and can be activated to provide such substrates with antimicrobial and/or odor reducing characteristics.

2. The cross-linkable, water soluble polymer of claim 1 wherein the ratio of amide group containing repeat units to epoxide group containing repeat units is at least 8:1, and wherein said polymer has a weight average molecular weight which is within the range of 5,000 to 5,000,000.

3. An aqueous coating composition which is particularly useful for coating substrates to provide the substrate with antimicrobial characteristics after halogenating, said aqueous coating compositions being comprised of water and the cross-linkable, water soluble polymer of claim 1.

4. A process for making a substrate with a durable antimicrobial coating which comprises (1) applying the aqueous coating composition of claim 3 to the substrate to produce a coated substrate, (2) heating the coated substrate to a temperature of at least about 100° C. produce a substrate with the durable coating, and (3) activating the substrate with the durable coating with a halogenating agent to produce the durable antimicrobial coating.

5. The process as specified in claim 4 wherein the substrate is a fabric selected from the group consisting of cotton, silk, wool, polyester fabrics, rayon fabrics, nylon fabrics, aramid fabrics, and blends thereof.

6. The process as specified in claim 4 wherein the substrate is a solid material selected from the group consisting of cellulosic materials, metals, polymeric materials, stone, wood, ceramics, and aluminum silicates.

7. A cross-linkable, water soluble polymer, said cross-linkable polymer having the structural formula:

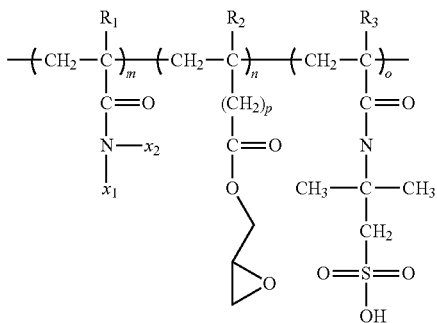

wherein, $R_1$, $R_2$, and $R_3$ can be the same or different and are independently selected from hydrogen atoms and alkyl groups containing from 1 to 10 carbon atoms; wherein p is an integer ranging from 0 to about 10; wherein m and n are integers ranging from 10 to about 1,000,000; wherein o is an integer ranging from 0 to about 1,000,000; wherein $x_1$ represents a chlorine atom, wherein $x_2$ is selected from hydrogen atoms and chlorine atoms; wherein the ratio of amide containing repeat units to epoxide group containing repeat units is at least 2:1, and wherein the different repeat units are distributed throughout the polymer in an essentially random order, and wherein said cross-linkable polymer can be used for coating substrates and can be activated to provide such substrates with antimicrobial and/or odor reducing characteristics.

8. The cross-linkable, water soluble polymer of claim 7 wherein the ratio of amide group containing repeat units to epoxide group containing repeat units is at least 8:1, and wherein said polymer has a weight average molecular weight which is within the range of 5,000 to 5,000,000.

9. An aqueous coating composition which is particularly useful for coating substrates to provide the substrate with antimicrobial characteristics after halogenating, said aqueous coating compositions being comprised of water and the cross-linkable, water soluble polymer of claim 7.

10. A process for making a substrate with a durable antimicrobial coating which comprises (1) applying the aqueous coating composition of claim 9 to the substrate to produce a coated substrate, (2) heating the coated substrate to a temperature of at least about 100° C. produce a substrate with the durable coating, and (3) activating the substrate with the durable coating with a halogenating agent to produce the durable antimicrobial coating.

11. The process as specified in claim 10 wherein the substrate is a fabric selected from the group consisting of cotton, silk, wool, polyester fabrics, rayon fabrics, nylon fabrics, aramid fabrics, and blends thereof.

12. The process as specified in claim 10 wherein the substrate is a solid material selected from the group consisting of cellulosic materials, metals, polymeric materials, stone, wood, ceramics, and aluminum silicates.

* * * * *